US012561257B2

(12) United States Patent
Wang et al.

(10) Patent No.: US 12,561,257 B2
(45) Date of Patent: Feb. 24, 2026

(54) INTERCONNECTION CLUSTERING ARCHITECTURE IN SYSTEM-ON-CHIP AND METHOD FOR FACILITATING DATA ACCESSING AND DATA TRANSFER OPERATIONS USING THE SAME

(71) Applicant: OMNIVISION TECHNOLOGIES, INC., Santa Clara, CA (US)

(72) Inventors: Wei Wang, Singapore (SG); Chin Tong Thia, Singapore (SG); Yidan Chen, Singapore (SG)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 183 days.

(21) Appl. No.: 18/137,103

(22) Filed: Apr. 20, 2023

(65) Prior Publication Data

US 2024/0354263 A1      Oct. 24, 2024

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
CPC .............................. G06F 13/10; G06F 2213/40
See application file for complete search history.

(56) References Cited

U.S. PATENT DOCUMENTS 8,719,753 B1 * 5/2014 Chow ................. H01L 25/0657
716/139
9,508,607 B2 * 11/2016 Chua-Eoan ........... G06F 1/3275

10,243,881 B2 * 3/2019 Bandic .................... H04L 49/00
10,673,745 B2 6/2020 Swarbrick et al.
2015/0331831 A1 * 11/2015 Solihin ................. G06F 15/167
709/212
2018/0203963 A1 * 7/2018 Eghbal ................ G06F 30/3308
2021/0173564 A1 * 6/2021 Pydipaty .............. G06F 16/275
2022/0366968 A1 * 11/2022 Liu ...................... G11C 11/4094
2023/0029860 A1 * 2/2023 Randall ................. G06F 12/084
2023/0187407 A1 * 6/2023 Molnar ................... H01L 25/50
257/777

FOREIGN PATENT DOCUMENTS

WO WO-2021041041 A1 * 3/2021 ........ G11C 11/4076
WO WO-2022013887 A1 * 1/2022 ........... G06F 30/327

OTHER PUBLICATIONS

Lio et al., "An efficient distributed memory interface for Many-Core Platform with 3D stacked DRAM," Date '10: Proceedings of the Conference on Design, Automation and Test in Europe, Mar. 2010, 6 pages.
Wassal et al., "Novel 3D Memory-Centric NoC Architecture for Transaction-Based SoC Applications," Conference: Electronics, Communications and Photonics Conference, 2011, 5 pages.

* cited by examiner

*Primary Examiner* — Rehana Perveen
(74) *Attorney, Agent, or Firm* — MUNCY, GEISSLER, OLDS & LOWE, P.C.

(57) ABSTRACT

A computing device is provided. The computing device includes a system-on-chip (SoC) device, and the SoC device includes a plurality of master devices and a stacked memory. The master devices are arranged on a die. The master devices are grouped in space into a plurality of logic device clusters with a clustering scheme defined according to operating requirements of the master devices. The stacked memory is disposed above the die. Connections between the stacked memory and the plurality of logic device clusters are established according to the clustering scheme defined.

7 Claims, 8 Drawing Sheets

INTERCONNECTION CLUSTERING ARCHITECTURE IN SYSTEM-ON-CHIP AND METHOD FOR FACILITATING DATA ACCESSING AND DATA TRANSFER OPERATIONS USING THE SAME

TECHNICAL FIELD

The present disclosure is related to integrated circuits, and, in particular, to a computing device and a method for facilitating data accessing and data transfer operations in a computing device including a system-on-chip.

BACKGROUND

A system-on-chip (SoC) consists of many peripherals, and these peripherals often send data and instructions back and forth. As a result, data traffic between these peripherals can be very complex. A conventional SoC uses hierarchical arbiters with a centralized memory controller to access the single piece of centralized dynamic random access memory. However, the inference speed and system frame rate of a neural processing unit (NPU) is limited by the performance of the interconnect, especially the usable bandwidth, and the routing complexity is significantly increased when the number of master devices in the SoC increases.

SUMMARY

In an aspect of the disclosure, a computing device is provided. The computing device includes a system-on-chip (SoC) device, and the SoC device includes a plurality of master devices and a stacked memory. The master devices are arranged on a first die (such as a logic die) of the SoC device. The master devices are grouped in space into a plurality of logic device clusters with a clustering scheme according to operating requirements of the master devices. The stacked memory is disposed above the first die (such as logic die). In some embodiments, the stacked memory is disposed on a second die (such as a memory die). In some embodiments, the first die containing plurality of master devices and the second die including stacked memory are stacked and encapsulated by a packaging material such that the second die is between the packaging material and the first die. Connections between the stacked memory and the clusters are formed according to the clustering scheme of the master devices.

In another aspect of the disclosure, a method for facilitating data accessing and data transfer operations in a computing device including a system-on-chip is provided. The system-on-chip includes a plurality of master devices and a stacked memory disposed or otherwise arranged above the master devices. In some embodiments, the plurality of master devices is disposed on a first die or wafer (such as a logic die) and the stacked memory is disposed on a second die or wafer (such as a memory or DRAM die) The method includes the following steps: grouping the master devices into a plurality of logic device clusters based on operating requirements of the master devices; assigning one or more memory banks of the stacked memory to each logic device cluster based on the operating requirement of each master device; formulating a network-on-chip (NoC) topology based on a data transfer traffic between the at least one master device of the plurality of logic device clusters and the assigned one or more memory banks; and formulating an arrangement of the master devices based on the plurality of logic device clusters grouped and corresponding connections between the master devices and the memory banks of the stacked memory.

BRIEF DESCRIPTION OF THE DRAWINGS

Non-limiting and non-exhaustive embodiments of the disclosure are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION OF THE DISCLOSURE

Figure 1A:
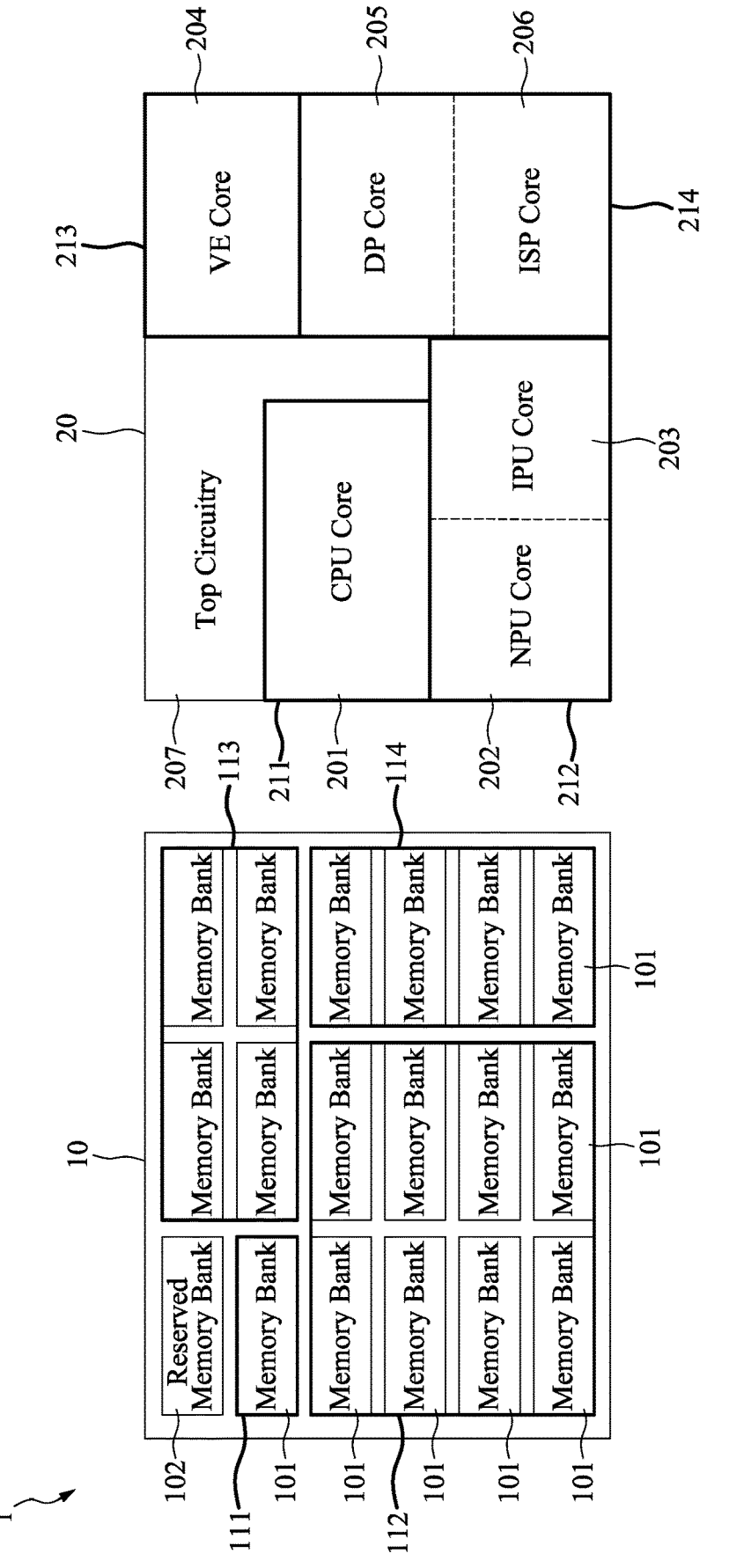
FIG. 1A is a block diagram of a system-on-chip device in accordance with an embodiment of the disclosure.

The following description is made for the purpose of illustrating the general principles of the disclosure and should not be taken in a limiting sense. The scope of the disclosure is best determined by reference to the appended claims.

The following description is presented to enable one of ordinary skill in the art to make and use the disclosure, and is provided in the context of a patent application and its requirements. Various modifications to the embodiments and the generic principles and features described herein will be readily apparent to those skilled in the art. Thus, the present disclosure is not intended to be limited to the embodiments shown, but is to be accorded the widest scope consistent with the principles and features described herein.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

It will be further understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another region, layer or section and not to limit or set the order. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (for example, rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

FIG. 1A is a block diagram of a system-on-chip device in accordance with an embodiment of the disclosure.

In an embodiment, the system-on-chip (SoC) device 1 may be disposed in a computing device (e.g., a personal computer, a smartphone, a tablet PC, a server, a cloud network, etc.), and may include a memory 10 and processing circuitry 20.

The memory 10 may be a stacked memory. The memory 10 may comprise a dynamic random access memory (DRAM), but the disclosure is not limited thereto. The memory 10 may include a plurality of memory banks 101 and a reserved memory bank 102.

The processing circuitry 20 may include top circuitry 207 and a plurality of master integrated devices (referred as master devices), such as a CPU (central processing unit) core 201, an NPU (neural processing unit) core 202, an IPU (intelligence processing unit) core 203, a VE (video encoder) core 204, a DP (data processing) core 205, an ISP (image signal processing) core 206. It should be noted that the master devices shown in FIG. 1A are presented for convenience of description, and one of ordinary skill in the art could adjust the number and functionalities of the master devices in SoC device 1 according to practical needs.

For example, the top circuitry 207 may include one or more circuits for power management and providing clock signals for the master devices. In addition, the top circuitry 207 may communicate with the reserved memory bank 102 in the memory 10 or communicate with an external memory (not shown in FIG. 1A). The external memory may be a memory device that is external to SoC device 1. The external memory may be communicatively coupled to the SoC device 1 through an external memory interface (EMI).

The CPU core 201 may be regarded as a general-purpose CPU core that handles general instructions. Generally, the CPU core operates at low bandwidth and low memory capacity.

The NPU core 202 may be regarded as an artificial-intelligence (AI) processor core for feature or object detection and recognition. The IPU core 203 may be regarded as an AI processor core to accelerate and enhance image signal processing. The NPU core 202 and IPU core 203 both operate at high bandwidth. The NPU core 202 and IPU core 203 may operate in a time-sharing manner. In embodiments, the plurality of master integrated devices may include one or multiple NPU cores 202 for handling different imaging applications.

The VE core 204 may be configured to perform video encoding. The VE core 204 may operate at medium bandwidth and high memory capacity.

The DP core 205 may be regarded as a data processing core. The DP core 205 may be a post-sensor data processing core which processes digital signals. Generally, the DP core 205 may operate at medium bandwidth and medium memory capacity.

The ISP core 206 may be configured to perform image signal processing. The ISP core 206 may operate at medium bandwidth and medium memory capacity.

Based on the operating conditions and requirements for the bandwidth and memory capacity of the master devices, the master devices can be grouped in space into multiple logic device clusters with a clustering scheme. One or more memory banks 101 can be grouped into memory clusters and assigned or otherwise allocated to individual logic device clusters. For example, the CPU core 201 may not share data bandwidth with other master devices. In such example, one or more of memory banks 101 (i.e., grouped in memory cluster 111) are assigned to the CPU core 201 supporting operation of CPU core 201, and the CPU core 201 has its own logic device cluster 211 (e.g., a cluster group). Since the NPU core 202 and IPU core 203 may share similar operating requirements of high bandwidth and high memory capacity and operate in a time-sharing manner, thus the NPU core 202 and IPU core 203 can be grouped into the same logic device cluster 212. In some embodiments, the NPU core 202 and IPU core 203 can be arranged to be placed next to each other in the physical layout of the SoC device 1. For example, eight of the memory banks 101 (i.e., associated with memory cluster 112) can be assigned to the grouped logic device cluster 212 to provide sufficient memory capacity supporting high bandwidth and high memory capacity needs for the NPU core 202 and IPU core 203. In addition, for some cases, these eight memory banks 101 assigned to logic device cluster 212 may have sufficient capacity to store data for master devices grouped in other logic device clusters, and master devices from other logic device clusters can access these eight memory banks through their respective NoC (network-on-chip) node, details of which follow.

The VE core 204 may be assigned with four of the memory banks 101 (i.e., memory cluster 113) due to its medium operating requirement for the bandwidth and high operating requirement for the memory capacity, and the VE core 204 can be grouped into its own logic device cluster 213. In some cases when the VE core 204 needs a memory capacity more than the initially assigned memory capacity (e.g., capacity provided by four memory banks 101) during operation, the VE core 204 can be configured to be able to access additional memory capacity either (i) from some of memory banks 101 in other memory cluster 112 such as memory cluster 112 that has been assigned to logic device cluster 212, or (ii) from the external memory through the associated NoC nodes.

For master devices having similar operating requirements for bandwidth and memory capacity, such as the DP core 205 and ISP core 206, these master devices can be grouped into same logic device cluster 214 so as to reduce the number of overall NoC nodes. For example, four of the memory banks 101 (i.e. ones grouped in memory cluster 114), which provide sufficient memory capacity and band- width for common use, can be assigned to logic device cluster 214. In case of operation when four memory banks 101 cannot provide adequate memory capacity to support operations of master devices in logic device cluster 214, individual master devices in logic device cluster 214 (e.g., the DP core 205 and/or ISP core 206) can either access some memory banks 101 in memory cluster 112 allocated to master devices in logic device cluster 212 or access the external memory. In addition, the DP core 205 and ISP core 206 can be placed adjacent in the physical layout of the SoC device 1.

In an embodiment, the clustering scheme can be formu- lated by Table 1, which tabulates cluster grouping in relating to operational requirement according to an embodiment of preset disclosure, as follows.

TABLE 1

| Type of Master Device | Bandwidth Requirement | Memory Capacity Requirement |
|---|---|---|
| A | High | High |
| B | High | Low |
| C | Low | High |
| D | Low | Low |

In the illustrated embodiments, master devices can be grouped into different types based on their operational requirement e.g., bandwidth and memory capacity require- ments and memory banks can be thereafter allocated accord- ingly in subsequent clustering operation. For example, the master device(s) of type A may refer to master device(s) having operating requirements of high bandwidth and high memory capacity. Each of the master devices of type A can be grouped into one logic device cluster on its own together with its sub-master devices. In addition, the number of memory banks 101 assigned to each of the master devices depends on bandwidth requirements, and the assigned memory banks are treated as a memory cluster. Moreover, since there might be high data-transfer traffic between the master device of type A and its associated memory cluster, no access to any of memory banks grouped in the memory cluster assigned to master device of type A is allowed from master device(s) grouped in other logic device clusters.

The master device(s) of type B may refer to the master device(s) having operating requirements of high bandwidth with low memory capacity. The number of memory banks 101 assigned to each of the master devices of type B depend on the bandwidth requirement of each master device of type B. In some applications, the master devices of type B may require higher memory capacity during operation, these master devices thus can be connected to other logic device clusters via their respective NoC nodes allowing these master devices of type B to access the memory banks associated with other device clusters and share the memory capacity of their associated memory clusters.

The master device(s) of type C may refer to the master device(s) having operating requirements of low bandwidth and high memory capacity. In some embodiments, fewer memory banks 101 are assigned to these master device(s) compare to the master devices of type A or type B. In operation, these master device(s) under type C may access additional memory address allocated by accessing or utiliz- ing the memory clusters associated with other logic device clusters when necessary. In some embodiments, these master devices of type C may be grouped with the master device(s) of type B (i.e., having low memory capacity requirement) to share their memory clusters, for example through time- sharing scheme.

The master device(s) of type D may refer to the master device(s) having operating requirements of low bandwidth and low memory capacity. In this case, these master devices may be assigned to any logic device clusters based on functionality. It should be appreciated that the types of master devices shown in Table 1 are provided merely as an example for illustration, for example in an alternative clus- tering scheme, additional types could be included to group master devices with other operation requirements such as with operating requirements of medium bandwidth or medium memory capacity. In another clustering scheme, master devices may be grouped only under types A, B, and C depending on operation needs and allowable memory capacity associated with SoC device 1.

In an embodiment, the clustering scheme of master devices may operate under rules whereby functionality of master devices is taken into account for cluster grouping, and functionally related master devices can be grouped into the same logic device cluster. Additionally, master devices that can operate on time-sharing scheme can also be grouped into the same logic device cluster sharing access to the local memory cluster thereof. As such, the total number of logic device clusters can be effectively minimized since more logic device clusters indicate more NoC nodes need to be configured as well as more complex traffic the NoC needs to handle. In additional, more complex interconnections between master devices of logic device cluster and memory banks of assigned memory clusters would be needed, which may also increase fabrication complexity.

Figure 1B:
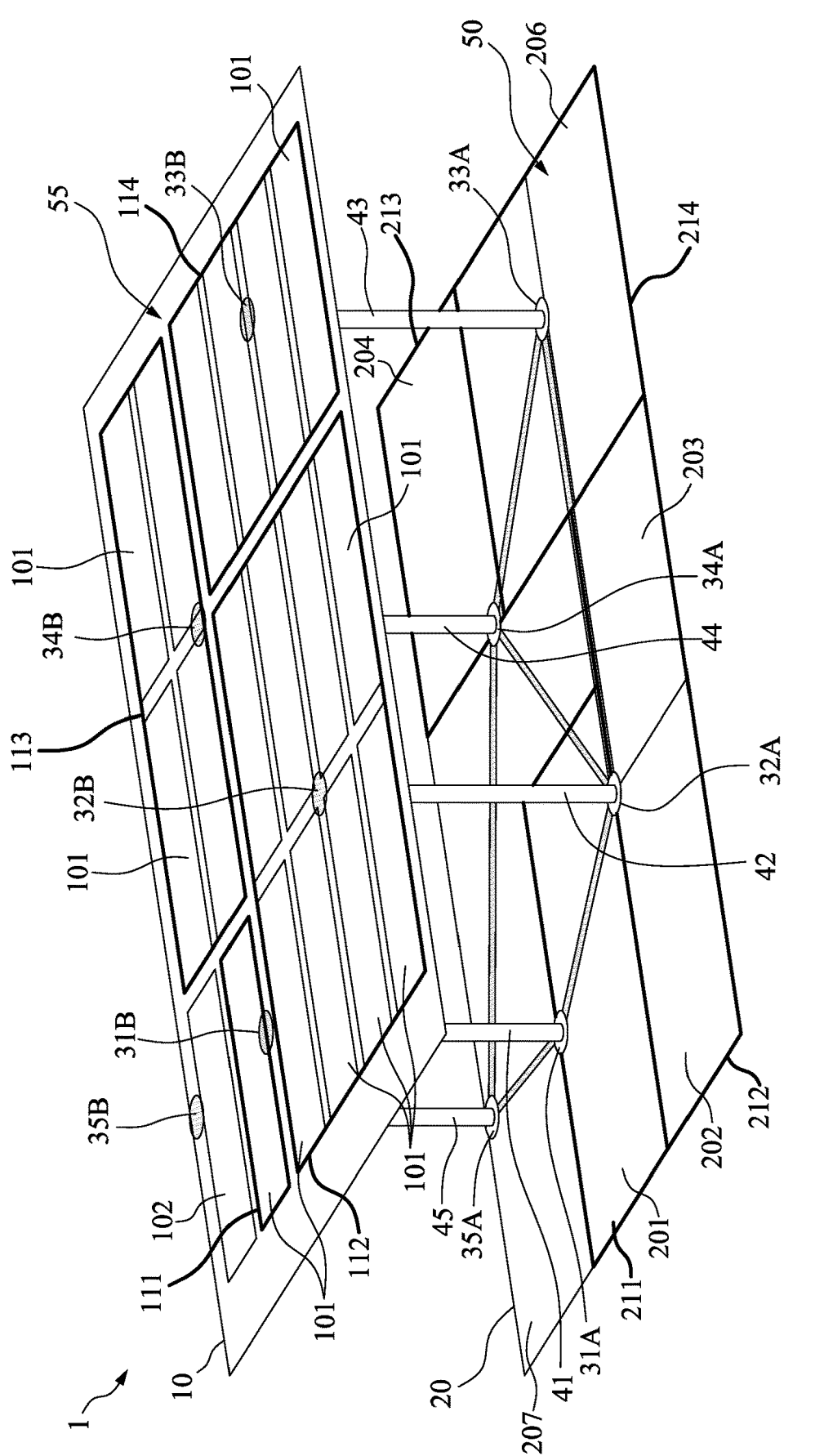
FIG. 1B is a perspective diagram of a system-on-chip (SoC) device in accordance with the embodiment of FIG. 1A.

FIG. 1B is a perspective diagram of a system-on-chip (SoC) device in accordance with the embodiment of FIG. 1A. Please refer to FIGS. 1A and 1B. It is appreciated that, FIGS. 1A-1B are provided herein to illustrate exemplary architecture arrangement of clustered master devices and associated memory clusters for a system-on-chip (SoC) device in according to teaching of present disclosure, thus well-known structures such as metal interconnects, inte- grated circuitries associated with master devices and memory banks as well as NoC node, associated NoC node controller and associate multiplexing circuitries and the like may have been omitted so as not to obscure the relevant teachings of clustering scheme and arrangement of master devices and memory bank.

In an embodiment, the SoC device 1 may be implemented using three-dimensional-stacking (3D-stacking) technique, and may include logic die 50 and memory die 55. Logic die 50 and memory die 55 may each formed of one or more wafer substrates or silicon substrate. The master devices may be implemented on the logic die 50. The hardware circuitries and/or logic circuitry associated with master devices such as CPU core 201, NPU core 202, ISP core 206 as well as logic circuitries for implementing NoC nodes are disposed on logic die 50. The memory 10 may be implemented on the memory die 55. The memory circuitries for forming DRAM memory banks in memory 10 may be disposed on memory die 55. The memory die 55 is disposed on a first side (upper side) of the logic die 50 containing master devices such that memory banks included in memory 10 are located above (or stacked above) the master devices along a depthwise direction normal to a surface of logic die 50.

In some embodiments, the logic die 50 and memory dies 55 are stacked and encapsulated in a packaging material (not illustrated) such that the memory die 55 is situated between the logic die 50 and the packaging material. The packaging material may comprise a resin material, a ceramic material, a polymer material or the like. In the same or different embodiments, the packaging material may include a molding compound formed of a mixture of epoxy and silica fillers. It is appreciated that in some embodiments, there may be additional one or more dies stacking above memory die 55 in SoC device 1. In such embodiments, the additional one or more dies stacking above memory die 55 are encapsulated within the packaging material such that the one or more dies and the memory die 55 are in between the packaging material and the logic die 50. In some embodiments, a plane or planar surface of a corresponding logic die 50 or memory die 55 may be referred as a die plane.

In embodiments, the memory clusters 111 to 114 on the memory die 55 may correspond to (coupled to) the logic device clusters 211 to 214 located on the logic die 50. For example, location or position of memory cluster 111 on the memory die 55 corresponds to that of logic device cluster 211 on the logic die 50 for interconnect routing consideration. In some embodiments, logic die 50 and memory die 55 may be included one to one correspondence. In one embodiment, memory banks of memory cluster 111 on the memory die 55 may be located directly above or at least in proximity to master device(s) e.g., CPU core 201 of logic device cluster 211 on logic die 50. Similarly, location of memory cluster 112 on the memory die 55 corresponds to that of logic device cluster 212 on the logic die 50, and so on. In one embodiment, memory banks of memory cluster 112 on the memory die 55 may be located directly above or at least in proximity to master device(s) e.g., NPU core 202 and IPU core 203 of logic device cluster 212 on logic die 50. Memory cluster 111 and logic device cluster 211 may be regarded as a physical cluster pair. Memory Clusters 112 and logic device cluster 212 may be regarded as another physical cluster pair, and so on. Such cluster arrangement provides a technical effect of achieving the shortest signal paths between clustered master devices and their corresponding memory banks, thereby lowering data accessing latency which effectively reduces power consumption during memory accessing.

More specifically, each of logic device clusters 211 to 214 on the logic die 50 may include at least one NoC node, such as NoC nodes 31A to 35A. Each of memory clusters 111 to 114 on the memory die 55 may include an I/O (input/output) pad (not shown) that may include a plurality of I/O bonds (not shown in FIG. 1B), such as I/O pads 31B to 35B. For example, the I/O pads 31B to 35B corresponding to memory clusters 111 to 114 are connected to the NoC nodes 31A to 35A through TSV (through-silicon via) such as TSV arrays 41 to 45 by representative TSVs in FIG. 1B for brevity). The number of I/O bonds in each of I/O pads 31B to 35B depends on the number of memory banks (e.g., memory bank 101) in the corresponding memory cluster. Master devices in each individual logic device clusters may access memory bank associated memory cluster through memory channels provided by TSVs.

It is appreciated that FIG. 1B provides an illustrational view on exemplary connections between memory banks included memory cluster 112 located on memory die 55 and corresponding one or more master devices of logic device cluster 211 to 214 on logic die 50 using TSVs, and may not represent actual physical connections employed for SoC device 1.

For example, electrical connections (or signal transmission path) between memory banks of memory cluster 112 on memory die 55 and the corresponding one or more master devices of logic device cluster 211 to 214 in some embodiments can be established via an array of hybrid bonding pads instead of TSVs. When the hybrid bonding scheme is used to implement the SoC device 1, the logic die 50 and memory die 55 are stacked and bonded together with corresponding electrical connections formed through respective I/O pads thereon. For example, the connections between the logic die 50 and memory die 55 are established by directly connecting I/O pads on the logic die 50 to the corresponding I/O pads at the same location on the memory die 55, so the logic die 50 and memory die 55 can be bonded and elements on logic die 50 and memory die 55 can be electrically connected through these connections of the respective I/O pads.

In one embodiment, a plurality of first arrays of hybrid bonding pads (with each array corresponds to an array or a set of I/O pads associated with memory banks of associated memory clusters on memory die 55) may be disposed between memory clusters 112 on memory die 55 and a plurality of second arrays of hybrid bonding pads (with each array corresponds to a set of I/O pads associated with master devices of logic device clusters on logic die 50) may be disposed between logic device clusters on logic die 50, where the plurality of first arrays of hybrid bonding pads and the plurality of second arrays of hybrid bonding pads are correspondingly disposed. That is, the number of hybrid bonding pads included in any one of the plurality of second arrays of hybrid bonding pads associated with a logic device cluster corresponds the number of hybrid bonding pads included in the corresponding first array of hybrid bonding pads. The location of each of hybrid bonding pads included in each individual array of the plurality of second arrays of hybrid bonding pads on logic die 50 has a one-to-one correspondence to the location of each of hybrid bonding pads included in each corresponding first array of hybrid bonding pads on logic die 50. For example, the number of hybrid bonding pads included in one of the first array of hybrid bonding pads associated with memory clusters 111 on memory die 55 is the same as the number of hybrid bonding pads included in one of the second arrays of hybrid bonding pads associated with the master device in logic device cluster 211 on logic die 50. The location of each of hybrid bonding pads included in one of the first arrays of hybrid bonding pads associated with memory clusters 111 on memory die 55 is arranged to be in correspondence with (or vertically aligned with) the location of each of hybrid bonding pads included in the corresponding one of the second arrays of hybrid bonding pads associated with the master device in logic device clusters 211 on logic die 50.

FIG. 1B illustrates a system-on-chip (SoC) device in accordance with the embodiment of FIG. 1A of the present disclosure. Each of the NoC nodes 31A to 35A may be disposed on an edge of the corresponding master device or a boundary (e.g., a peripheral region) between adjacent master devices in the same logic device cluster. The NoC nodes 31A to 35A may be disposed on the peripherals of the entirety of the associated clustered master devices. In the illustrated embodiments, each of the I/O pads 31B to 35B may be disposed on the edge of the corresponding (or coupled) memory cluster. The I/O pads 31B to 35B may be disposed on the periphery of the entirety of the master devices. It is appreciated that for I/O pads 31B to 35B may each represent an array or a group set of I/O pads, and the circle used merely to denote the locations of I/O pads arrangement. For example, I/O pad 31B may represent a location of an array of I/O pads associated with memory cluster 111 with each I/O pad arranged to electrically connect the corresponding memory bank 101 of memory cluster 111 to the master devices of logic device cluster 211 e.g., through a corresponding hybrid bonding pad or a corresponding through silicon via structure. I/O pad 32B may represent a location of an array of I/O pads associated with memory cluster 112 with each I/O pad electrically connect the corresponding memory banks 101 of memory cluster 112 to the master devices of logic device cluster 212 e.g., through a corresponding hybrid bonding pad or a through silicon via, and so on.

In embodiments, I/O pads 31B to 35B may be disposed corresponding to locations of the NoC nodes 31A to 35A to provide connections between the NoC nodes 31A-35A with corresponding memory cluster. Such arrangement can provide the shortest signal paths between the NoC nodes 31A to 35A and corresponding I/O pads 31B to 35B to facilitate the physical layout design of the clustered master devices on logic die 50 and the assigned corresponding memory banks of memory 10 on memory die 55.

For example, a stacked DDR3 (double-data rate 3) DRAM of 2 Gbits disposed on memory die 55 having 8 memory banks (e.g., memory bank 101) can be used (e.g., grouped as memory cluster 112) in accordance to the teaching of present disclosure, with each individual memory bank may provide a data width of 128 bits, and the overall data width supported by the memory 10 can achieve 8*128=1024 bits. With the clock rate of 100 MHz used by the DDR3 DRAM, the memory 10 can support a raw bandwidth of 25.6 GBps. Assuming that the memory 10 is randomly accessed, the usable bandwidth of the memory 10 may be calculated as 50% of the raw bandwidth, which is approximately 12.8 Gbps.

For another example, an LPDDR4 (low-power double-data rate 4) DRAM with 2G bits is used as the memory 10 (i.e., the LPDDR4 DRAM is not 3D-stacked) disposed on memory die 55, the data width supported by the memory 10 is 16 bits. With the clock rate of 2133 MHz used by the LPDDR4 DRAM, the memory 10 can support a raw bandwidth of 8.5 GBps. Assuming that the memory 10 is randomly accessed, the usable bandwidth of the memory 10 may be calculated as 75% of the raw bandwidth, which is approximately 6.4 GBps.

The usable bandwidth of other memory clusters 111, 113, and 114 can be calculated in a similar manner. The usable bandwidth of each cluster and the size of its corresponding memory cluster in the provided example is shown in Table 2, which tabulates logic device cluster groups and memory size allocated and associated usable bandwidth.

TABLE 2

| Logic Device Cluster | Local Master Device(s) | Size of Memory Cluster | Usable Bandwidth |
|---|---|---|---|
| 211 | Top Circuitry & CPU Core | 8 MB | 1.6 GBps |
| 212 | NPU Core & IPU Core | 64 MB | 12.8 GBps |

TABLE 2-continued

| Logic Device Cluster | Local Master Device(s) | Size of Memory Cluster | Usable Bandwidth |
|---|---|---|---|
| 213 | VE Core | 32 MB | 6.4 GBps |
| 214 | DP Core & ISP Core | 32 MB | 6.4 GBps |

The 3D-stacked architecture design in FIG. 1B may use hybrid bonding scheme (i.e., I/O bonding between I/O pads 31B to 35B and NoC nodes 31A to 35A) to allow many more connection points to form between the memory 10 and the master devices of respect logic device clusters to achieve higher memory bandwidth than the non-3D-stacked DRAM device. In addition, the 3D-stacked DDR3 DRAM with a relatively low speed can provide double bandwidth of LPDDR4 DRAM with a relatively high speed given that the sizes of the 3D-stacked DDR3 DRAM and LPDDR4 DRAM are the same. Thus, the operating requirements of different master devices may be optimized by utilizing memory clusters 111 to 114 of varying memory sizes. In addition, the proximity between the memory 10 and the master devices can reduce power consumption in data transfer to and from the memory 10 as the physical route between each master device and its corresponding memory cluster can be shortened using the 3D-stacked memory technique.

In FIG. 1B, the NoC nodes 31A to 35A may be disposed within the physical layouts of the master devices or on the edge of the physical layouts of the master devices. In some cases, at least one of the NoC nodes 31A to 35A may be disposed at or around edges of one master device, proximate to a neighboring master device that may be of same or different logic device cluster. For example, the NoC node 33A can be arranged on one edge of DP core 205 proximate to the ISP core 206. In some cases, at least one of the NoC nodes 31A to 35A may be disposed in a region between adjacent master devices such that NoC nodes 31A to 35A can be used by nearby master devices for accessing data from memory banks 101 of memory 10 achieving shortest routing distance possible. For example, the NoC node 32A may be disposed in region located among by CPU core 201, NPU core 202, and IPU core 203 such as at respective edges of CPU core 201, NPU core 202, and IPU core 203 such that CPU core 201, NPU core 202, and IPU core 203 may share NoC node 32A in operation of accessing respective memory banks of the memory 10.

In some embodiments, the I/O pads 31B to 35B shown in FIG. 1B may be disposed within the physical layouts of the memory clusters 111 to 114 as well as on or around the edges of the memory clusters 111 to 114. In some cases, at least one of the I/O pads 31B to 35B may be disposed in available space within a corresponding memory cluster. The I/O pad 33B is arranged within the memory cluster 114 corresponding to the location of NoC node 33A. In some cases, at least one of the I/O pads 31B to 35B may be disposed at edges of one memory cluster, proximate to a neighboring memory cluster. The I/O pad 31B in the illustrated embodiment is arranged at an edge of memory cluster 111 proximate to memory cluster 112. For example, I/O pads 31B to 35B can be arranged to be disposed in regions within a given memory cluster or at edge or boundary area between adjacent memory clusters such that NoC node can be located closer or in proximity to the corresponding master devices to provide shortest routing distance between master devices and NoC node(s) within NoC network to reduce memory access latency and provide power-saving during memory accessing operation.

One of ordinary skill in the art could appreciate that the clusters of the master devices and memory banks can be changed according to operational needs such as bandwidth, latency, and memory capacity requirements, and the locations of the NoC nodes and the I/O pads can also be arranged according to the physical layout of the SoC device 1 to fulfill such operational needs.

In an embodiment, the NoC nodes 31A to 35A may form an NoC topology that may be built based on data traffic between logic device clusters 211 to 214. In some embodiments, each master device may access memory banks 101 only in respective memory clusters (i.e., local memory bank) except the VE core 204 which has a high requirement for memory capacity. In the illustrated embodiment, there are four memory banks allocated in memory cluster 113 associated with logic device cluster 213, in the case where the VE core 204 requires more memory capacity, the VE core 204 may access additional memory bank 101 associated with other logic device cluster. For example, the VE core 204 may access memory banks 101 of the memory cluster 112 associated with logic device cluster 212 for additional memory space.

In some embodiments, some master devices may enable one or more additional functions which need more memory space. For example, when a 3D denoise function of the ISP core 206 is enabled, the ISP core 206 may need more memory space than the current available memory capacity supplied by the corresponding memory cluster 114. At this time, the user can program the address registers that are corresponding to the ISP core 206 such that the memory access command issued by the ISP core 206 can enable the ISP core 206 to access the memory clusters associated with other logic device clusters and/or the external memory (e.g., external DRAM).

In some embodiments, the NoC nodes 31A to 35A can be connected in the NoC topology shown in FIG. 1B for flexibility. Each of logic device clusters 211 to 214 may have three tiers of memory access, namely first tier operation or Tier 1, second tier operation or Tier 2, and third tier operation or Tier 3. For example, Tier 1 of memory access may feature the lowest latency by having each master device accessing its local memory provide by the associated memory cluster. Tier 2 of memory access may feature medium latency and more memory capacity by allowing master devices to access the memory banks of its assigned memory cluster as well as the memory cluster corresponding to the neighbor logic device cluster. Tier 3 of memory access may feature the highest latency but has the most memory capacity by allowing such master device to access the memory cluster of a relatively distant logic device cluster and/or the external memory.

It is appreciated that a first latency threshold and a second latency threshold can be set to distinguish the three latency levels in Tiers 1 to 3. A first memory-capacity threshold and a second memory-capacity threshold can be set to distinguish the three memory-capacity levels in Tiers 1 to 3, where the second latency threshold is higher than the first latency threshold, and the second memory-capacity threshold is larger than the first memory-capacity threshold. In some embodiments, the first memory-capacity threshold may be equal in the size to the local memory space supplied by the assigned memory cluster. The second memory-capacity threshold may be equal in the size to the combination of the local memory space supplied by the respective memory cluster and the size of allocated memory banks in the memory cluster associated with the neighbor logic device cluster.

For example, the latency of the Tier-1 memory access can be lower than the first latency threshold, and the memory capacity of the Tier-1 memory access may not exceed the memory size of the local memory cluster associated with a given master device. The latency of the Tier-2 memory access may range between the first latency threshold and the second latency threshold. The memory capacity of the Tier-2 memory access may be between the first memory-capacity threshold and the second memory-capacity threshold. The latency of the Tier-3 memory access may be higher than the second latency threshold. The memory capacity of the Tier-3 memory access may be larger than the second memory-capacity threshold such as allowing access not only to locally assigned memory space of respective assigned memory cluster, but also memory space in memory cluster associated with neighboring logic device cluster as well as memory space from external memory that is connected to the SoC device 1. More details of the multi-tier memory access are provided in the embodiments of FIGS. 2A to 2D.

In some embodiments, the Tier-3 memory access is optional. The SoC device 1 may operate without an external memory.

FIGS. 2A to 2D are diagrams illustrating the hierarchy of multi-tier memory access in accordance with the embodiment of FIG. 1A. Please refer to FIG. 1A, FIG. 1B, and FIGS. 2A to 2D. The SoC device 1 includes a device cluster block 220 and a NOC network block 230. The NoC network block 230 is coupled to device cluster block 220. External memory block 240 includes an external memory controller 353 and an external memory 360 coupled to the external memory controller 353. The external memory block 240 may be included in an external device (e.g., another DRAM device) that is coupled to the NoC network block 230 of SoC device 1 for data communication. For example, the external device communicates with SoC device 1 through an external memory interface (EMI) such as Double-Data Rate (DDR) interface.

Figure 2A:
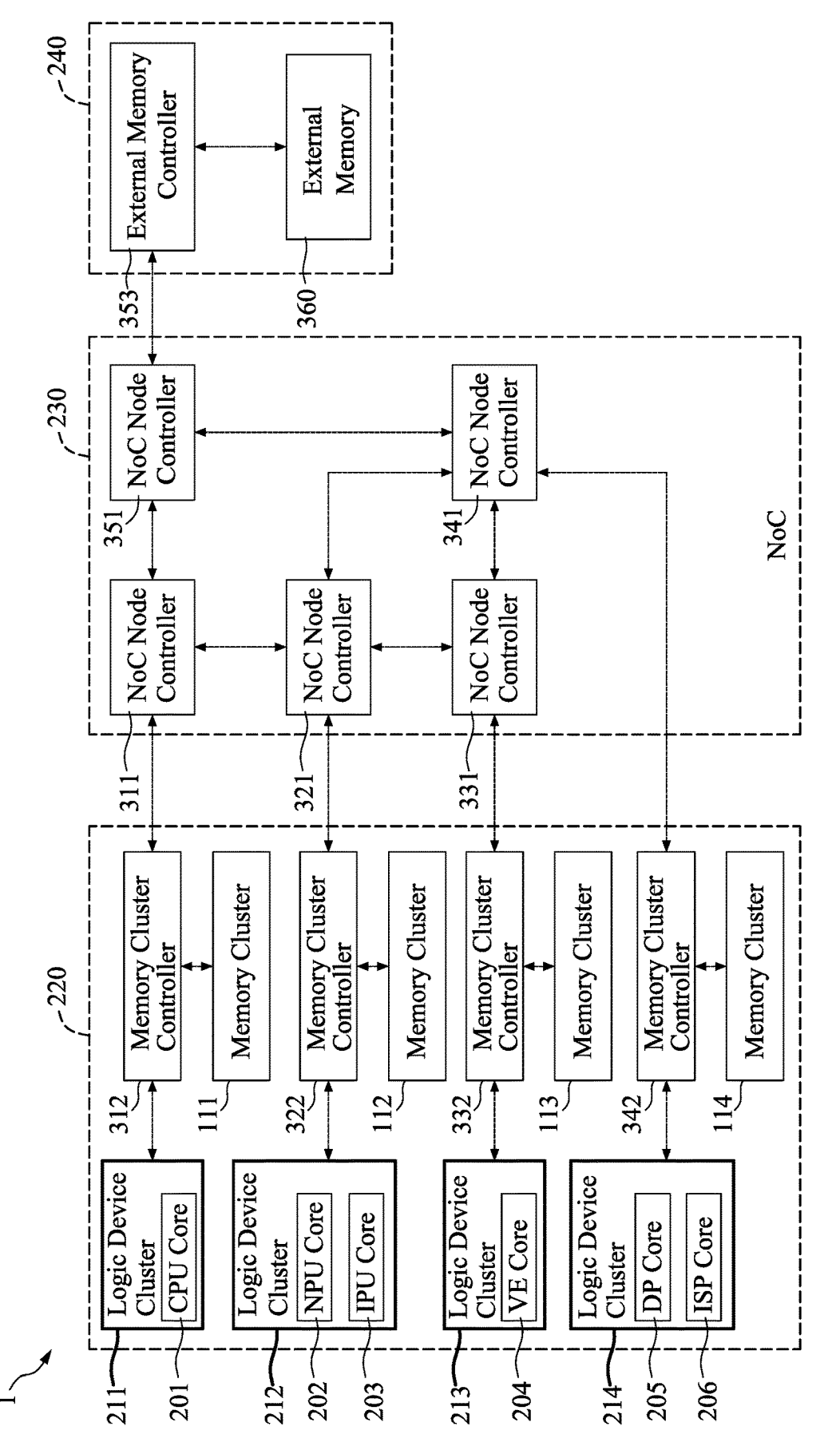
FIGS. 2A to 2D are diagrams illustrating the hierarchy of multi-tier memory access in accordance with the embodiment of FIG. 1A.

In an embodiment, each of the NoC nodes 31A to 34A may include an NoC node controller that is coupled to a memory cluster controller associated with local memory cluster. For example, the NoC node 31A corresponding to logic device cluster 211 may include a NoC node controller 311 that is coupled to a memory cluster controller 312, as shown in FIG. 2A. The memory cluster controller 312 may be a DDR DRAM controller that is configured to control memory access operation of memory cluster 111, which is a local memory cluster assigned for logic device cluster 211 (e.g., including the CPU core 201). The memory cluster controller 312 may be coupled to the associated memory banks for controlling local data accessing/transfer operation. The memory cluster controller 312 may be coupled to provide data access channel between master devices (e.g., CPU core 201) of assigned logic device cluster 211 and memory banks of memory cluster 111 in response to receiving the memory access command from a given master device (e.g., CPU core 201). The NoC node controller 311 may be a router that is configured to forward or route the memory access command received from master devices of other logic device clusters to the memory cluster controller 312 to which the memory address indicated by the memory access command is directed. The NoC node controller 311 may also forward the data, that is retrieved by the memory cluster controller from its assigned local memory cluster associated with other logic device clusters (such as neighboring logic device cluster 212) or retrieved by the external memory controller 353 from the external memory 360 coupled thereto, to the master device (e.g., CPU core 201) which issues the memory access command.

Similarly, the NoC node 32A corresponding to logic device cluster 212 may include a NoC node controller 321 that is coupled to a memory cluster controller 322. The memory cluster controller 322 may be configured to control memory access operation of memory cluster 112, which is a local memory cluster for master device of logic device cluster 212 (e.g., including the NPU core 202 and IPU core 203). The memory cluster controller 322 may be coupled to the associated memory banks for controlling local data accessing/transfer operation. The memory cluster controller 322 may be coupled to provide data access channel between master devices (e.g., NPU core 202 and IPU core 203) of assigned logic device cluster 212 upon receiving a memory access command from a given master device (e.g., NPU core 202 and/or IPU core 203). Similarly, the NoC node controller 321 may be a router that is configured to forward or route the memory access command received from master devices of other logic device clusters to the memory cluster controller 322 to which the memory address indicated by the memory access command is directed. The NoC node controller 321 may also forward the data, that is retrieved by the memory cluster controller (such as NoC node controller 311) from its assigned local memory cluster associated with other logic device clusters (such as neighboring logic device cluster 211) or retrieved by the external memory controller 353 from the external memory 360, to the master device (e.g., NPU core 202 and IPU core 203) which issues the memory access command.

The NoC node 33A corresponding to logic device cluster 213 may include a NOC node controller 331 that is coupled to memory cluster controller 332. The memory cluster controller 332 may be configured to control memory access operation of memory cluster 113, which is a local memory cluster for logic device cluster 213 (e.g., including the VE core 204). The memory cluster controller 332 may be coupled to associated memory banks for controlling local data accessing/transfer operation. The NoC node 331 may be coupled to provide data access channel between master devices (e.g., VE core 204) of assigned logic device cluster 213 upon receiving a memory access command from a given master device (e.g., VE core 204). Similarly, the NoC node controller 331 may be a router configured to forward or route the memory access command received from master devices of other logic device clusters to the memory cluster controller 332 to which the memory address indicated by the memory access command is directed. The NoC node controller 331 may also forward the data, that is retrieved by the memory cluster controller from its assigned local memory cluster associated with other logic device clusters (such as neighboring logic device cluster 212 or logic device cluster 214) or retrieved by the external memory controller 353 from the external memory 360, to the master device (e.g., VE core 204) that has issued the memory access command.

The NoC node 34A corresponding to logic device cluster 214 may include a NoC node controller 341 and memory cluster controller 342. The memory cluster controller 342 may be configured to control memory access operation of memory cluster 114, which is a local memory cluster for logic device cluster 214 (e.g., including the DP core 205 and ISP core 206). The memory cluster controller 342 may be coupled to associated memory banks for controlling local data accessing/transfer operation. The memory cluster controller 342 may be coupled provide data access channel between master devices (e.g., DP core 205 or ISP core 206) of assigned logic device cluster 214 upon receiving a memory access command from a given master device (e.g., DP core 205 and/or ISP core 206). The NoC node 35A may include the NoC node controller 351. It should be noted that the NoC node 35A is located in the top circuitry 207.

In embodiments, top circuitry 207 includes circuitry implementation for NoC node 31A-35A and associated NoC node controllers 311, 321, 331,341, 351, and may be implemented on logic die 50.

Each of the NoC nodes 31A to 35A may help to control the traffic within the NoC topology based on some specific arbitration schemes. When a plurality of data transfer requests arrive at a specific NoC node, the specific NoC node can check the priority of these data transfer requests and then store and forward the data accordingly.

Figure 2B:
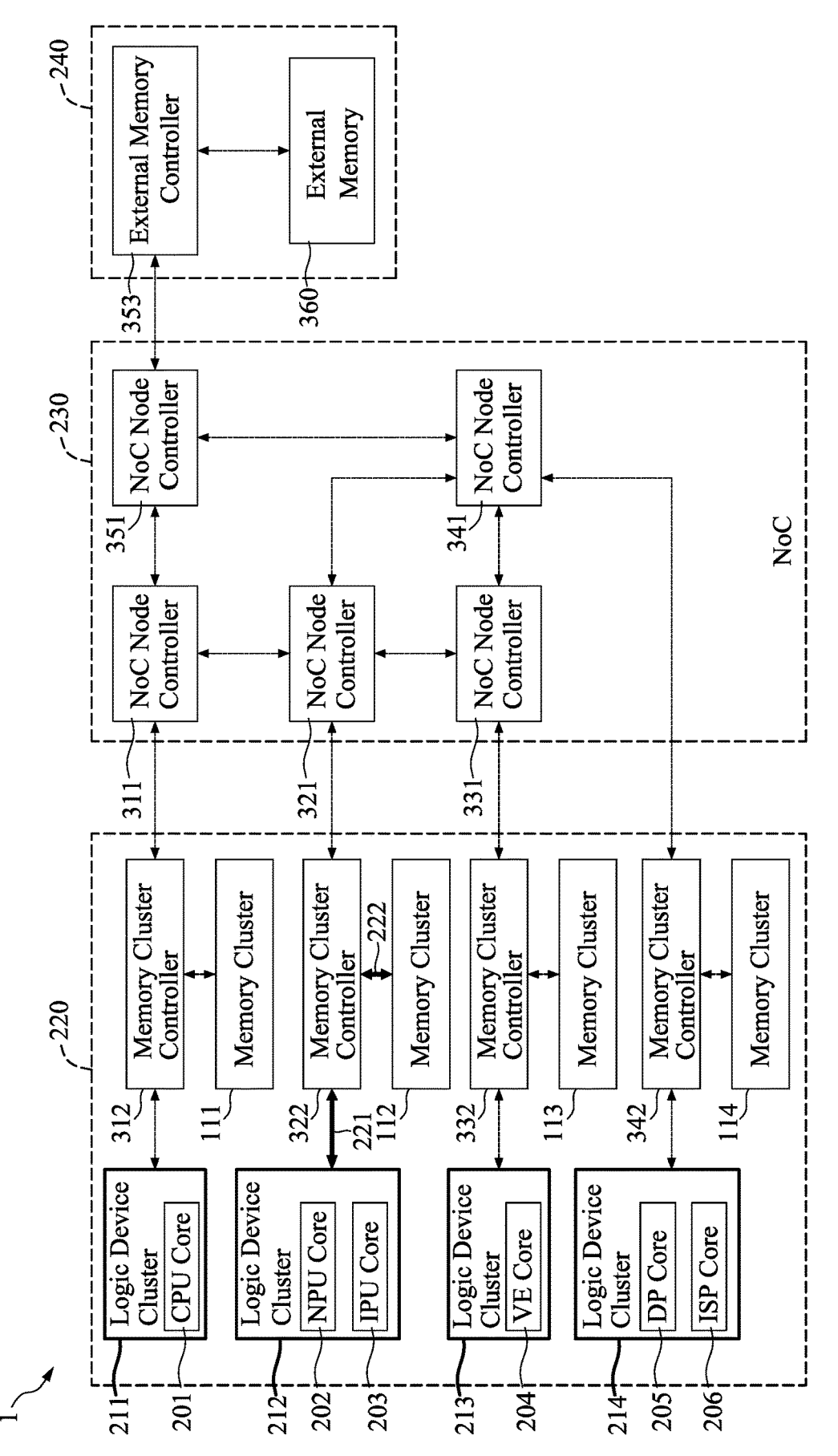

Please refer to FIG. 2B. In an exemplary operation, the IPU core 203 in logic device cluster 212 may issue a memory write command with a first memory address which is within a first memory address range of the memory cluster 112 corresponding to logic device cluster 212. In the illustrated embodiment, the memory cluster controller 322 in the NoC node 32A may write data indicated by the memory write command to the local memory cluster 112 in response to receiving the memory write command containing the first memory address, wherein the data path (e.g., data access connection) is shown by the bolded arrows 221 and 222 in FIG. 2B. For example, upon determining that the first memory address indicated by the memory write command is within a first memory address range of the memory cluster 112 corresponding to logic device cluster 212, the memory cluster controller 322 operatively establishes a first data access connection between the CPU core 201 (e.g., a first master device) and the memory cluster 112 (e.g., a first memory cluster) to initiate a Tier-1 memory write operation or first tier memory write operation. As the memory write command and its data writing operation can be completed within device cluster block 220, it can be considered that the IPU core 203 of logic device cluster 212 performs a Tier-1 memory-write operation (or first tier read/write operation). Similarly, when the IPU core 203 issues a memory read command with the first memory address, the memory cluster controller 322, upon determining that the first memory address included in the memory read command is within the first memory address range of the memory cluster 112, operatively establishes a first data access connection between the IPU core 203 (e.g., a first master device) and the memory cluster 112 (e.g., a first memory cluster) to read data directly from the local memory cluster 112 and to transmit the data directly to the IPU core 203 for processing, thereby achieving a Tier-1 memory-read operation or first tier memory read operation. In embodiments, a corresponding memory cluster controller may determine and identify that the memory access operation is a Tier-1 memory access operation based on first memory address included in the memory read or write command.

Figure 2C:
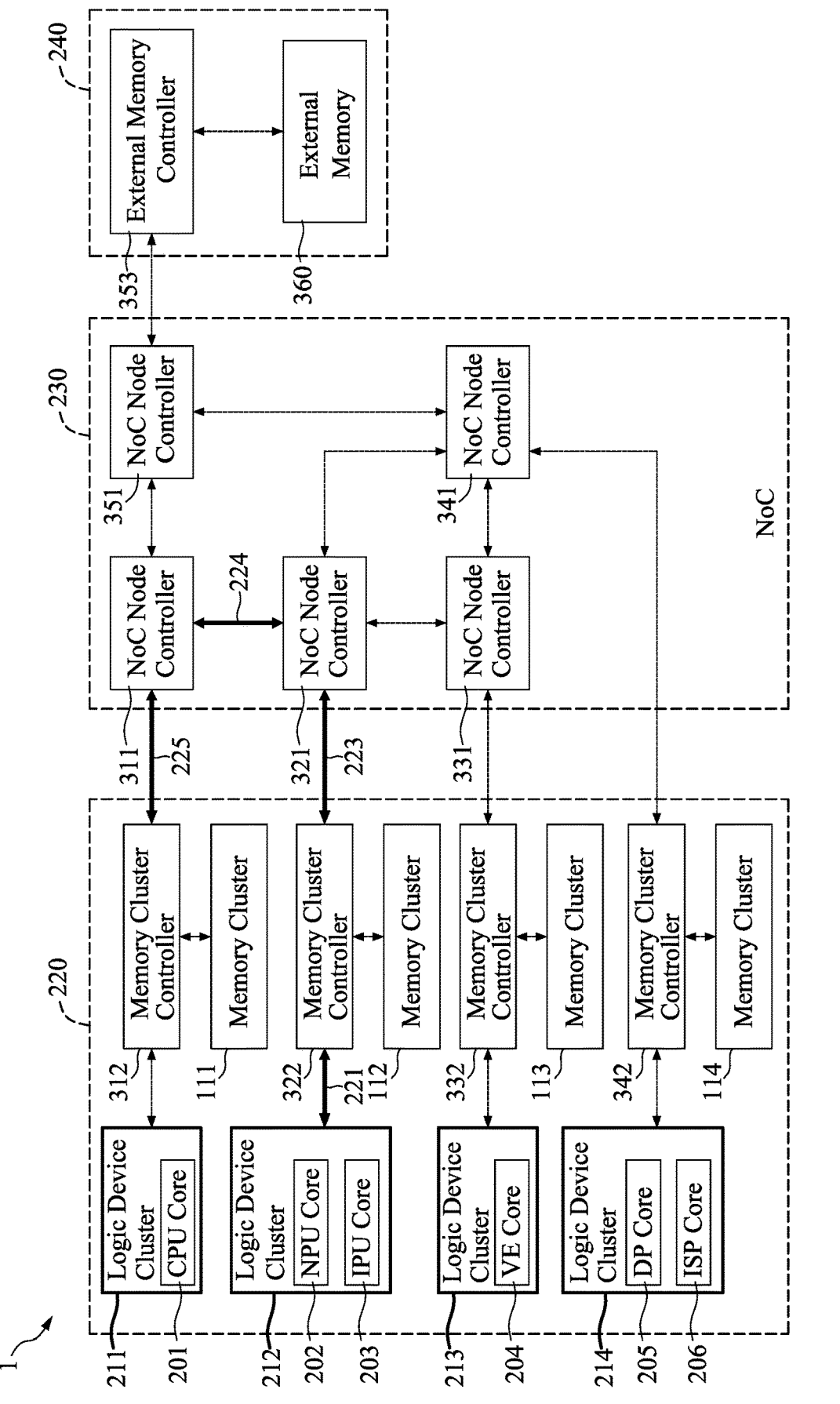

Please refer to FIG. 2C. The form of first memory address may be configured to comply with Advanced extensible Interface (AXI) protocol or a graphic interface protocol. In another exemplary operation, the IPU core 203 in logic device cluster 212 issues a memory write command with a second memory address that is outside of the first memory address range of memory cluster 112 but is within a second memory address range of another memory cluster of the plurality of memory cluster such as the memory cluster 111 corresponding to the neighbor logic device cluster 211.

The memory cluster controller 322 may determine whether the memory location to be written to indicated by the memory write command is related memory sectors (or memory banks) in memory cluster 112. In an operation, when memory cluster controller 322 determines that the second memory address indicated in the issued memory write command falls outside of the first memory address range of memory cluster 112, the memory cluster controller 322 forwards the memory write command containing the second memory address to the coupled NoC node controller 321 of the NoC node 32A for memory location verification.

In response to receiving the memory write command containing the second memory address, the NoC node controller 321 may determine that the location of the second memory address is located within the memory address range of memory cluster 111 and thus forwards a message including a first cluster network access request to the NoC node controller 311 of the NoC node 31A, wherein the first cluster network access request contains information on the second memory address indicated in the initial memory write command. The NoC node controller 311 of the NoC node 31A then forwards the corresponding request to the coupled memory cluster controller 312. Thereafter, the memory cluster controller 312 may operate to establish data communication channel with the corresponding memory sector and write data indicated by the memory write command to corresponding memory location in memory cluster 111, where the data path is shown by the bolded arrows 221 and 223-226 in FIG. 2C.

Since the memory write command is completed across device cluster block 220 and NoC network block 230, it can be considered that the IPU core 203 of logic device cluster 212 performs a Tier-2 memory-write operation (or second tier write operation).

network access request) containing memory read command along with the requested memory address information to the NoC node controller 311 of the NoC node 31A, which then issue memory read command with the second memory address to the memory cluster controller 312. The memory cluster controller 312 may read data indicated by the memory read command from memory cluster 111. The memory cluster controller 312 subsequently forwards the data to the NoC node controller 321 of the NoC node 32A through the NoC node controller 311 of the NoC node 31A. Thus, the IPU core 203 can receive the data through the NoC node controller 321 of the NoC node 32A and memory cluster controller 322. Since the memory read command is completed across device cluster block 220 and NoC network block 230, it can be considered that the IPU core 203 of logic device cluster 212 performs a Tier-2 memory-read operation (or second tier read operation). In embodiments, a corresponding memory cluster controller may determine and identify that the memory access operation is a Tier-2 memory access operation based on the second memory address included in the memory read or write command.

In some embodiments, the second memory address may be included in a form of message to be routed through network node. Such message may include at least address information, cluster information, cluster identification number, data information. In an embodiment, the second memory address may comprise of address block for second memory address location, memory size parameter block, cluster identification block, burst mode block, data length block, network mask parameter block and data block.

An example of a message including a network access request for Tier 2 communication follows in Table 3, but the fields may vary by implementation scheme.

TABLE 3

| Format | Field | Width (Bit) | |
|---|---|---|---|
| ADDR [31:0] | Address | 32 | Memory address location |
| SEC[0] | Size | 1 | Memory sector size |
| ID[2:0] | Identification | 4 | Logic device cluster group identification |
| BURST[3:0] | Burst mode Transmission | 4 | Data transmission mode for temporarily transferring data at maximum throughput |
| LEN[3:0] | Data length | 4 | Data length information |
| MASK | Data masking mode | | Data masking mode for network transmission |
| DATA | Data | | Data to be transmit for read and write operations |

Similarly, when the IPU core 203 issues a memory read command with the second memory address during its operation, the memory read command and Tier-2 memory read operation (or second tier read operation) can be completed along the data path shown by the bolded arrows in FIG. 2C. For example, the memory cluster controller 322 of memory cluster 112 may determine that the second memory address indicated by the memory read command is located outside of the memory address range of the memory cluster 112, and forward such memory read command to the coupled NoC node controller 321 in the NoC node 32A. NoC node controller 321 of NoC node 32A may determine that the memory location to be read by the memory read command received is located in memory cluster 111 and memory access operation belongs Tier-2 memory read operation (or second tier read operation). The NoC node controller 321 of the NoC node 32A may forward a message including a corresponding network access request (e.g., first cluster The corresponding NoC node controller (such as NoC node controller 321) may convert the received the message forwarded by memory cluster controller 322 containing second me memory address into flits for forming a network data packet or data stream for the NoC node controller 321 forwarding to the corresponding NoC node controller (NoC node controller 311) of routed NoC node to perform Tier-2 data accessing.

Figure 2D:
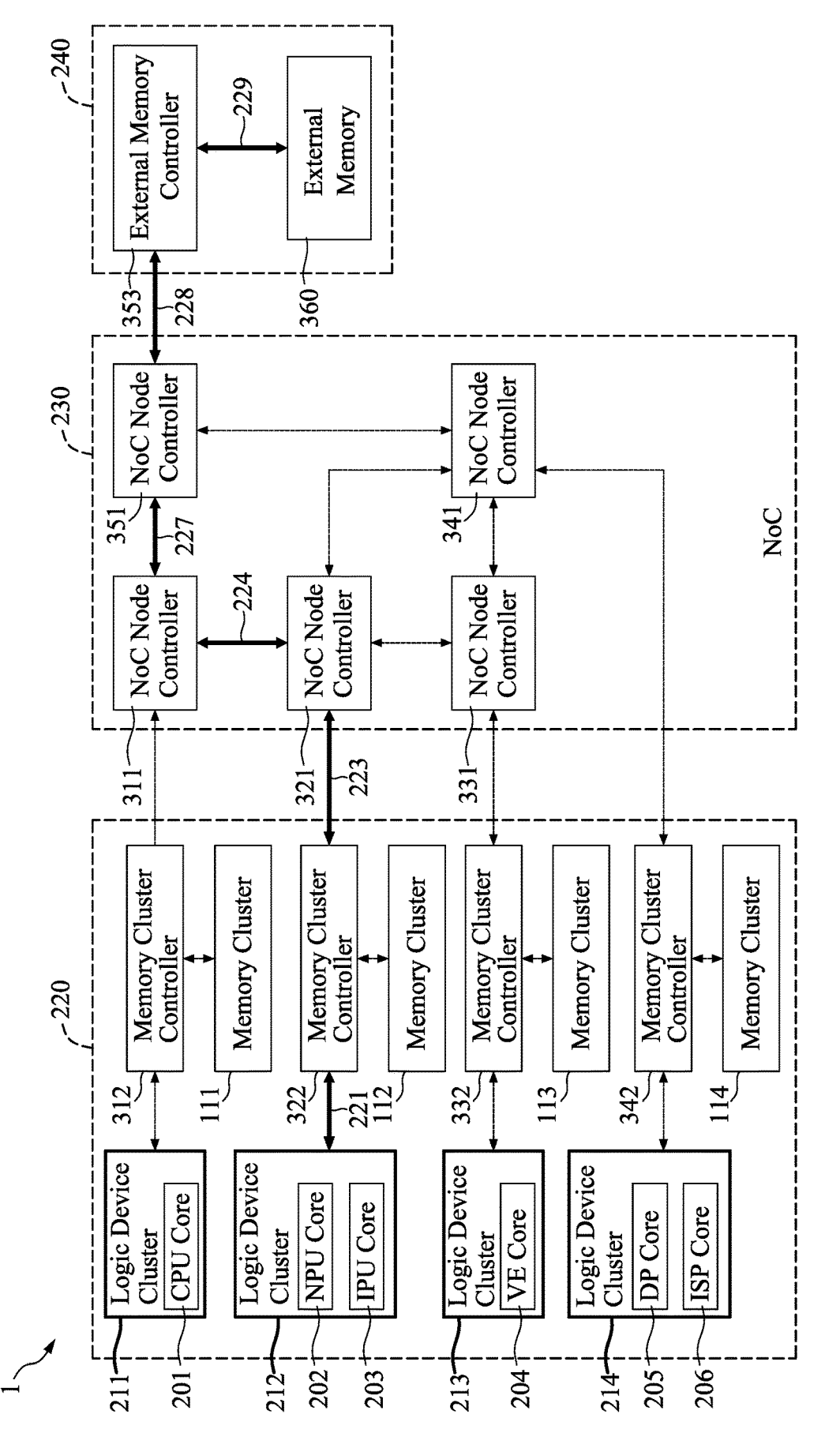

Please refer to FIG. 2D. In another exemplary operation, when IPU core 203 grouped in logic device cluster 212 issues a memory write command with a third memory address which is outside of the first memory address range and the second memory address range but is within a third memory address range provided by the external memory 360 connected to SoC device 1. The third memory address may be included in a message form routing through NoC Network for Tier-3 data communication. Similarly to the Tier-2 data accessing operation, in an embodiment, the third memory address may comprise of address block for third memory address location, memory size parameter block, cluster identification block, burst mode block, data length block, network mask parameter block and data block as described in Table 3.

The memory cluster controller 322 may determine that the memory location to be written to by the memory write command is outside of the associated first memory address range associated with memory cluster. The memory cluster controller 322 operatively forwards the memory write command with a third memory address to coupled NoC node controller 321 of the NoC node 32A. NoC node controller 321 of the NoC node 32A may forward a message including a second cluster network access request containing the corresponding memory write command to the NoC node controller 351 of the NoC node 35A upon determining that the third memory address indicated in the message with the second cluster network access request is located in the external memory 360. The external memory controller 353 may write data indicated by the memory write command included in the message to corresponding memory location in the external memory 360, where the data path is shown by the bolded arrows 221, 223-224, and 227-229 in FIG. 2D. Since the memory write command is completed across device cluster block 220, NoC network block 230, and external memory block 240, it can be considered that the IPU core 203 of logic device cluster 212 performs a Tier-3 memory-write operation (or third tier write operation).

Similarly, when the IPU core 203 issues a memory read command with the third memory address, the memory read command can be completed along the data path shown by the bolded arrows in FIG. 2D. For example, the memory cluster controller 322 may determine that the memory location to be read by the memory read command is a memory location outside of the first memory address range of memory cluster 112. The memory cluster controller 322 then forwards the memory read command with the third memory address to the coupled NoC node controller 321 of the NoC node 32A for data access over NoC network. In response to determining that the third memory address is located in the external memory 360, the NoC node controller 321 of the NoC node 32A may forward a message including a second cluster network access request with corresponding memory read command along with the third memory address to the NoC node controller 351 of the NoC node 35A. The external memory controller 353 may read data indicated by the memory read command from the external memory 360, and forward the data to the NoC node controller 321 of the NoC node 32A through the NoC node 31A. The IPU core 203 may receive the data through the NoC node controller 321 of the NoC node 32A and memory cluster controller 322. It can be considered that the IPU core 203 of logic device cluster 212 performs a Tier-3 memory-read operation (or third tier read operation).

It is appreciated that the number of NoC nodes linked between the memory cluster controller and the external memory 630 may depend on the configuration of the NoC network topology of SoC device 1. For example, in FIG. 2D, the data access connection between the IPU core 203 of logic device cluster 212 and the external memory 360 is established through NoC node controllers 311, 321 and 351. In another embodiment, the data access connection between the IPU core 203 of logic device cluster 212 and the external memory 360 may be established through more NoC nodes, e.g., such as data traffic additionally routed through NoC node controller 341. In yet another embodiment, fewer NoC nodes may be used to form data access connection between the IPU core 203 of logic device cluster 212 and the external memory 360. That is, the number of NoC nodes employed between external memory 360 and the requested logic device (e.g., IPU core) may depend on the configuration of NoC topology or network traffic loading.

Since the memory read command is completed across device cluster block 220, NoC network block 230, and external memory block 240, it can be considered that the IPU core 203 of logic device cluster 212 performs a tier-3 memory-read operation. In embodiments, a corresponding memory cluster controller may determine and identify that the memory access operation is a tier-3 memory access operation based on third memory address included in the memory read or write command.

It should be noted that the master device(s) in different logic device clusters 211 to 214 can perform tier-1, tier-2, or tier-3 memory access operations in a similar manner.

Figure 3:
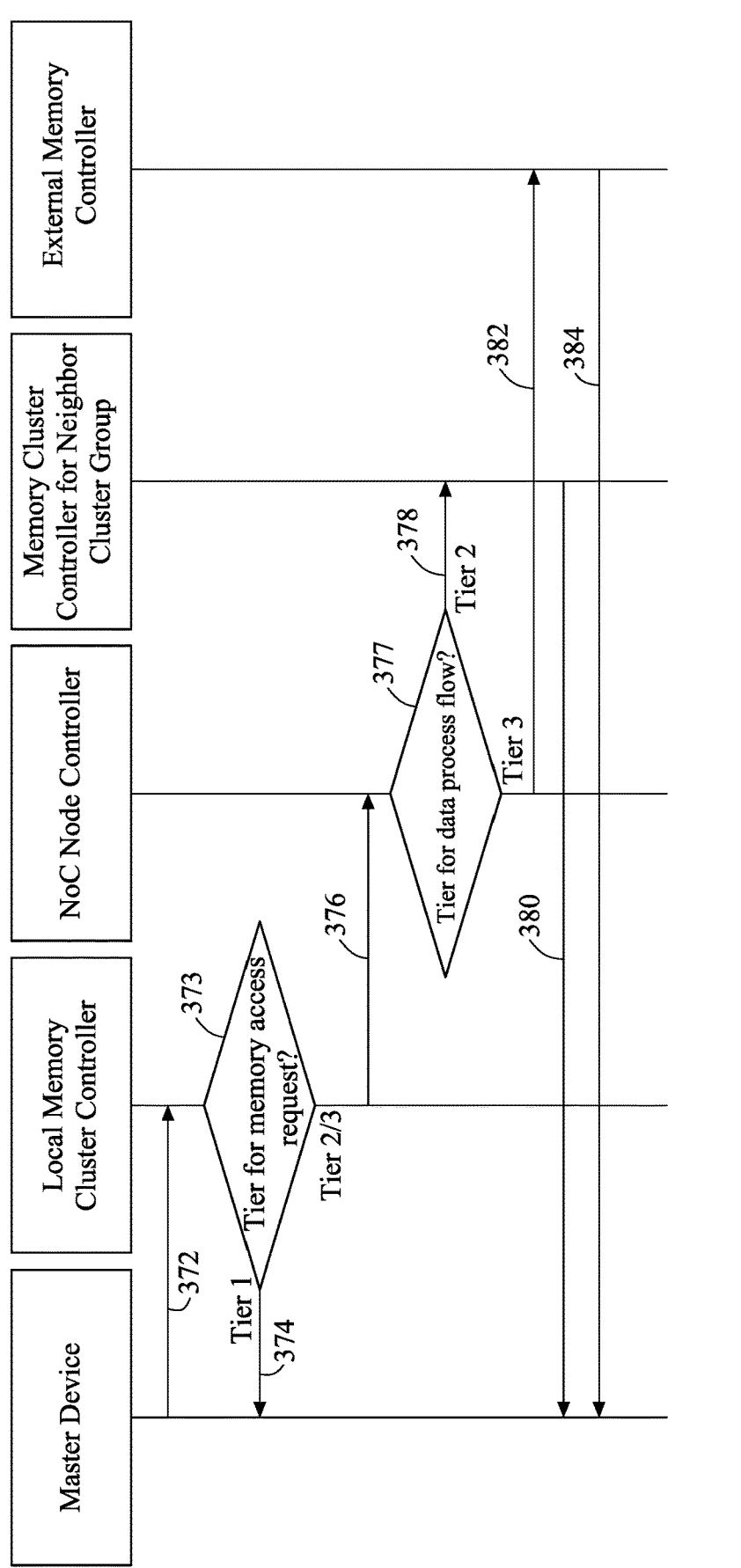
FIG. 3 is a flowchart of a memory access operation performed by a master device in accordance with an embodiment of the disclosure.

FIG. 3 is a flowchart of a memory access operation performed by a master device in accordance with an embodiment of the disclosure. Please refer to FIG. 1A, FIGS. 2A-2D, and FIG. 3.

In the beginning, when a master device (e.g., IPU core 203) in a specific logic device cluster (e.g., cluster 212) of the SoC device 1 is to perform a memory access operation, the master device may first issue a memory access request to the local memory cluster controller (e.g., memory cluster controller 322) of the logic device cluster (e.g., logic device cluster 212) to which the master device belongs (arrow 372). The local memory cluster controller (e.g., memory cluster controller 322) may determine the operation tier of the memory access request (block 373), such as tier 1, tier 2, or tier 3. In response to the local memory cluster controller (e.g., memory cluster controller 322) determining that the memory access request is a tier-1 memory access request, the local memory cluster controller (e.g., memory cluster controller 322) may access local memory through a data path between the master device (e.g., IPU core 203) and the local memory cluster (arrow 374). In response to the local memory cluster controller determining that the memory access request is a tier-2 or tier-3 memory access request (i.e., the memory address indicated in the memory access request excess memory address range of the associated local memory), the local memory cluster controller (e.g., memory cluster controller 342) may forward the memory access request to the corresponding NoC node controller (e.g., NoC node controller 321) within the same NoC node (e.g., NoC node 32A) (arrow 376). Since the memory access request is forwarded to the local NoC node controller, it may indicate that the memory access request is to be completed with the assist of NoC topology, and this forwarded memory access request may be referred to as a cluster network access request.

The local NoC node controller (e.g., NoC node controller 321) may determine the tier of the memory access request (block 377), such as tier 2 or tier 3. In response to the local NoC node controller determining that the memory access request is a tier-2 memory access request, the local NoC node controller may forward the memory access request to the NoC node controller (e.g., NoC node controller 321) of the neighbor NoC node. For example, the NoC node controller 321 may forward the memory access request to the NoC node controller 311 of the NoC node 31A, which then forward such memory access request to the memory cluster controller 312 associated with the memory cluster 111 to establish a data path between the master device of requester (e.g., IPU core 203) in the specific cluster group and the memory location of memory cluster in the neighbor logic device cluster (arrow 380). Thus, the master device in the specific logic device cluster group can access the memory cluster in the neighbor logic device cluster through the established data path to perform data read and write operation efficiently.

In response to the local NoC node controller determining that the memory access request is a tier-3 memory access request, the local NoC node controller may forward the memory access request to the external memory controller (arrow 382) (e.g., through one or more NoC nodes in the NoC topology). For example, the NoC node controller 321 may forward the memory access request to the external memory controller 353 through the respective NoC node controller 311 associated with NoC node 31A, the respective NoC node controller 351 associated with NoC node 31A, and the external memory controller 353 may establish a data path between the master device in the specific logic device cluster and the external memory (arrow 384). Thus, the master device in the specific group can access the external memory through the established data path.

In one embodiment, each of memory cluster controllers 312, 322, 332, 342, each of NoC node controllers 311, 321, 331, 341, 351, and external memory controller 353 may be implemented as hardware logic (e.g., application specific integrated circuits, field programmable gate arrays, etc.), In one embodiment, each of memory cluster controllers 312, 322, 332, 342, each of NoC node controllers 311, 321, 331, 341, 351, and external memory controller is built with hardware logic that configured to perform the operation illustrated by FIG. 3 during the operation of SoC device 1.

Figure 4:
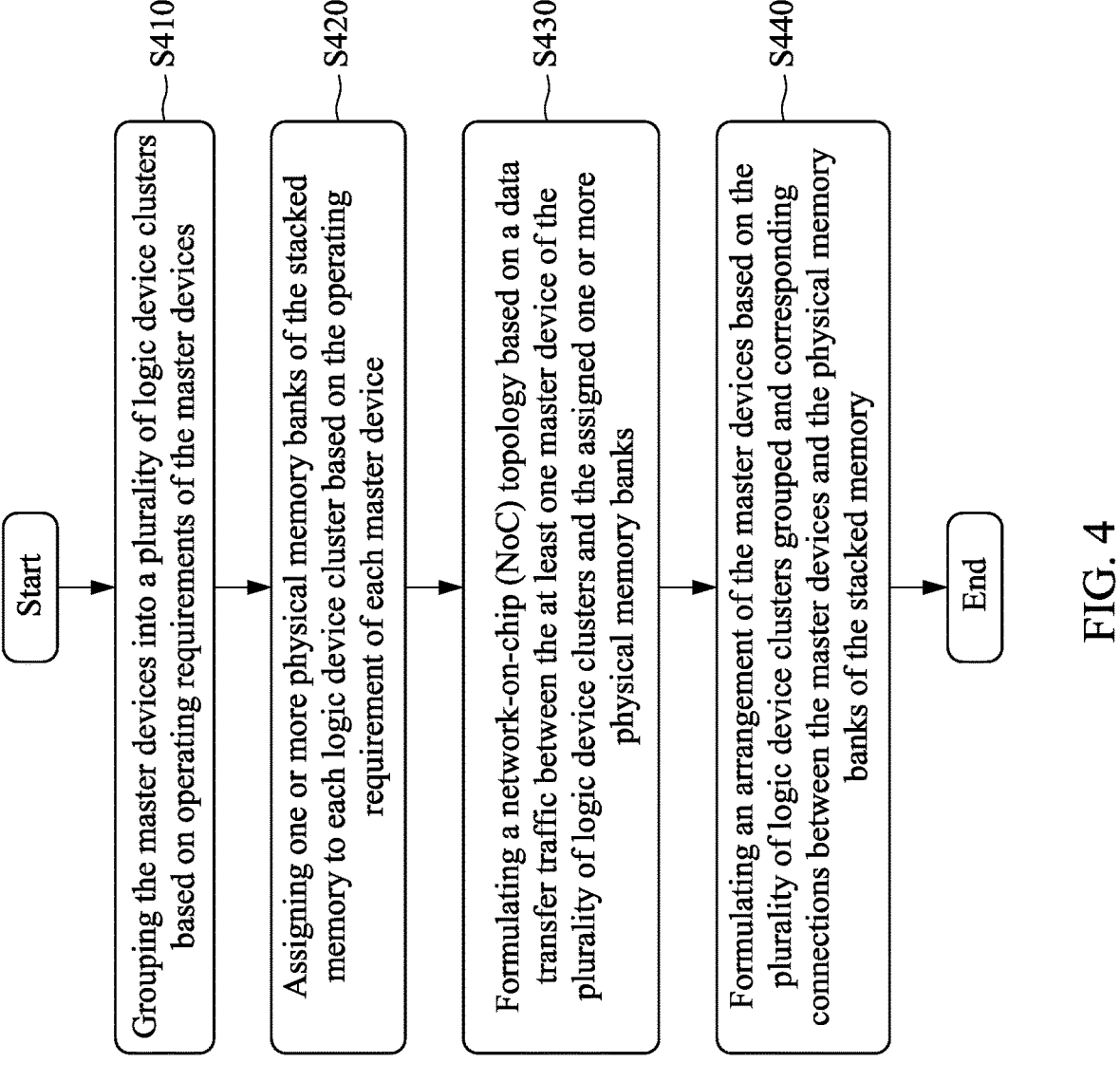
FIG. 4 is a flowchart of a method for building an interconnection architecture in a system-on-chip in accordance with an embodiment of the disclosure.

FIG. 4 is a flowchart of a method for building an interconnection architecture in a system-on-chip in accordance with an embodiment of the disclosure. Please refer to FIGS. 1A-1B, FIGS. 2A-2D, and FIG. 4.

For example, the system-on-chip (e.g., SoC device 1) may include a plurality of master devices (e.g., including processing cores 201 to 206 on logic die 50) and a stacked memory (e.g., memory 10 on memory die 55) disposed on above of the master devices, as shown in FIG. 1B. The master devices may be regarded as processing cores with different functions, such as the CPU core 201, NPU core 202, IPU core 203, VE core 204, DP core 205, and ISP core 206. The exemplary flow shown in FIG. 4 includes the following steps.

Step S410: grouping the plurality of master devices into a plurality of logic device clusters based on operating requirements of the master devices. In some embodiments, the operating requirements of the master devices may include requirements for bandwidth and memory capacity of the master devices. In some other embodiments, the operating requirements of the master devices may further include latency requirements of the master devices. As shown and described in the example illustrated by FIG. 1A, the CPU core 201 is grouped into logic device cluster 211 for the requirement of low bandwidth and low memory capacity. The NPU core 202 and IPU core 203 are grouped into logic device cluster 212 for requiring high bandwidth with low memory capacity. The VE core 204 is grouped into logic device cluster 213 for requirement medium bandwidth but high memory capacity. The DP core 205 and ISP core 206 are grouped into logic device cluster 214 for their similar operational requirements of medium bandwidth and memory capacity requirements. The master devices may be grouped into the logic device clusters based on functionality as well as masters devices with similar functionality or related function may have similar operational requirement as well as data interchanging operation. Group such master devices into same logic device clusters can increase data processing efficiency.

Step S420: assigning one or more memory banks of the stacked memory to each logic device cluster based on the operating requirement of each master device. As shown in the example embodiment illustrated by FIG. 1A, logic device clusters 211 to 214 correspond to memory clusters 111 to 114. For example, memory clusters 111, 112, 113, and 114 may have 1 memory bank, 8 memory banks, 4 memory banks, and 4 memory banks assigned, respectively.

Step S430: formulating a network-on-chip (NoC) topology based on a data transfer traffic between the at least one master device of the plurality of logic device clusters and the assigned one or more memory banks. For example, the NoC topology may include a plurality of NoC nodes, and each NoC node may be configured to manage memory accesses between a corresponding logic device cluster of the plurality of logic device clusters and the memory clusters associated with one or more logic device clusters of the plurality of logic device clusters neighboring to the corresponding logic device cluster.

Step S440: formulating an arrangement of the master devices based on the plurality of logic device clusters grouped and corresponding connections between the master devices and the memory banks of the stacked memory. For example, the positions of logic device clusters 211 to 214 on logic die 50 corresponds to that of memory clusters 111 to 114 on memory die 55, as shown in FIG. 1B.

It is appreciated that the number processing or operational steps included in flowchart illustrated by FIG. 4, may occur in any order and even in parallel. Additionally, processing or operational steps may be added to, or removed from, the flowchart illustrated by FIG. 4 in accordance with the teachings of the present disclosure. It is appreciated that flowchart illustrated by FIG. 4 represents one possible implementation for operating an SoC device system having different type of processing core and stacked memory architecture as illustrated in FIG. 1A to FIG. 1B. Additionally, it is appreciated that the flowchart illustrated by FIG. 4 is not limited to only the SoC device system illustrated in FIG. 1A to FIG. 1B as well as FIG. 2A to FIG. 2B that may be used for image sensor, but rather the flowchart illustrated by FIG. 4 may be applicable for controlling memory accessing operation of other embodiments of SoC device system that involve dynamically handling data traffic of multiple processing units and stacked memory architecture based on operation requirements.

The process or operation described in FIG. 4 for building an interconnection architecture in a system-on-chip may be implemented using software and/or hardware. The techniques described may constitute machine-executable instructions embodied within a tangible or non-transitory machine (e.g., computer) readable storage medium, that when executed by a computing machine will cause the computing machine to perform the operations described.

Accordingly, a computing device and method for building an interconnection architecture in a system-on-chip are provided, capable of building an interconnection architecture in the SoC device using a stacked memory. In addition, the master devices in the SoC device may be grouped into multiple logic device clusters with a clustering scheme defined according to operating requirements (e.g., including bandwidth, memory capacity, latency, or a combination thereof) of the master devices. The usable bandwidth of SoC device can be improved. The SoC device can provide higher throughput with the same die size using the stacked memory.

The SoC device can provide better performance with the same chip size, and it can be considered as cost reduction to some extent. In addition, the requirements for the bandwidth, memory capacity, and latency between the master devices can be balanced in the SoC device. The routing complexity in the SoC device can be mitigated using the stacked memory and cluster pairs, and the physical route distance between the master devices and the stacked memory can be shortened so as to reduce power consumption of the SoC device.

The embodiments may further be described using the following clauses.

1. A computing device comprising a system-on-chip (SoC) device, the SoC device comprising:
    a plurality of master devices, arranged on a first die of the SoC device, wherein the master devices are grouped in space into a plurality of logic device clusters based on a clustering scheme defined according to operating requirements of the master devices; and
    a stacked memory, disposed above the first die;
    wherein connections between the stacked memory and the plurality of logic device clusters are established according to the clustering scheme defined.

2. The computing device of clause 1, wherein the connections forms a network-on-chip (NoC) topology that comprises a plurality of NoC nodes, and one or more memory banks in the stacked memory are grouped into a plurality of memory clusters, wherein the plurality of memory clusters are connected through the plurality of NoC nodes.

3. The computing device of clause 2, wherein each memory cluster is coupled to one logic device cluster of the plurality of the logic device clusters, and one or more memory banks included in each of the plurality of memory clusters are arranged to be disposed above each respective logic device cluster of the plurality logic device clusters.

4. The computing device of clause 2, wherein the plurality of logic device clusters is linked or otherwise electrically connected to the plurality of NoC nodes of the NoC topology, and each NoC node is configured to manage memory accesses between a corresponding logic device cluster of the plurality of logic device clusters and the memory clusters associated with one or more logic device clusters of the plurality of logic device clusters neighboring to the corresponding logic device cluster.

5. The computing device of clause 4, wherein each memory cluster includes a memory cluster controller, and each NoC node includes an NoC node controller coupled to the corresponding memory cluster controller, wherein the memory cluster controller of a first memory cluster of the plurality of memory clusters is allocated to a first master device of a first logic device cluster, wherein in response to the memory cluster controller of the first memory cluster determining that a memory access command being issued from the first master device of the first logic device cluster contains a first memory address located within a first memory address range of the first memory cluster, the memory cluster controller of the first memory cluster operatively establishes a first data access connection between the first master device of the first logic device cluster and the first memory cluster of the plurality of memory clusters to initiate a first tier operation, the first memory cluster comprising at least one memory bank of the stacked memory.

6. The computing device of clause 5, wherein in response to the memory cluster controller of the first memory cluster determining that a second memory address included in the memory access command being issued from the first master device of the first logic device cluster exceeds the first memory address range of the first memory cluster, the memory cluster controller of the first memory cluster operatively forwards the memory access command to the NoC node controller of a first NoC node included in the plurality of NoC node being coupled to the memory cluster controller of the first memory cluster.

7. The computing device of clause 5, wherein in response to the memory cluster controller of the first memory cluster determining that the second memory address indicated by the memory access command issued from the first master device of the first logic device cluster exceeds the first memory address range of the first memory cluster, the memory cluster controller of the first memory cluster operatively communicates with the NoC node controller of the coupled first NoC node, and causes the coupled NoC node controller of the coupled first NoC node to send a message containing a first cluster network access request to a second NoC node of the plurality of NoC nodes corresponding to a second logic device cluster through the first NoC node in response of determining that the second memory address is located within a second memory address range of a second memory cluster assigned to the second logic device cluster of the plurality of logic device clusters so as to perform a second tier operation.

8. The computing device of clause 7, wherein in response to receiving a message including a first cluster network access request containing a second memory address, the NoC node controller of the second NoC node determines whether the second memory address indicated by the first cluster network access request is located within the second memory address range of the second memory cluster, wherein in response to the NoC node controller of the second NoC node determining the second memory address indicated by the first cluster network access request is within the second memory address range of the second memory cluster, the NoC node controller of the second NoC node operatively establishes a second data access connection between the first logic device cluster and the second memory cluster of the plurality of memory clusters assigned to the second logic device cluster through the first NoC node, the second memory cluster comprising at least one memory banks of the stacked memory that is different from the at least one memory bank of the first memory cluster.

9. The computing device of clause 5, further comprising:
    an external memory controller for controlling access of an external memory coupled to the SoC device;
    wherein in response to the memory cluster controller of the first memory cluster coupled to the NoC node controller of the first NoC node determining that a third memory address indicated by the memory command exceeds the first memory address range of the first memory cluster, and the memory cluster controller forwards the memory access command to the NoC node controller of the first NoC node;

wherein in response to the NoC node controller of the first NoC node determining that the third memory address indicated by the first cluster network access request of the message is outside of a memory address range of the stacked memory, the NoC node controller of the first NoC node operatively sends a second cluster network access request containing the third memory address to the external memory controller through at least one of the second NoC node and a third NoC node to perform a third tier operation, wherein in response to the external memory controller receiving the second cluster network access request containing the third memory address, the external memory controller operatively establishes a third data access connection between the first logic device cluster and the external memory through the first NoC node, the second NoC node, and the third NoC node.

10. The computing device of clause 9, wherein the memory cluster controller of the first memory cluster operatively determines whether a memory access operation of the memory access command corresponds to the first tier operation, the second tier operation, or the third tier operation based on a programmed memory address included in the memory access command.

11. The computing device of clause 1, wherein the clustering scheme is determined based on bandwidth and capacity requirements of the master devices.

12. The computing device of clause 11, wherein the clustering scheme is further determined based on latency requirements of the master devices.

13. The computing device of clause 1, wherein the master devices are processing cores with different functions.

14. The computing device of clause 13, wherein the master devices comprises a CPU (central processing unit) core, an NPU (neural processing unit) core, an IPU (intelligence processing core) core, a VE (video encoder) core, a DP (digital processing) core, and an ISP (image signal processing) core.

15. The computing device of clause 14, wherein the NPU core and IPU core are disposed next to each other in a physical layout of the first die, and the DP core and the ISP core are disposed next to each other in the physical layout of the first die.

16. The computing device of clause 1, wherein the one or more memory banks are coupled to each logic device cluster through an input/output (I/O) pad via a respective NoC node corresponding to each logic device cluster.

17. The computing device of clause 16, wherein the I/O pad of the one or more memory banks assigned to each logic device cluster is disposed on a first boundary region of the one or more memory banks, and the NoC node corresponding to each logic device cluster is disposed on a second boundary region of each logic device cluster which aligns with the first boundary region.

18. The computing device of clause 16, wherein the I/O pad of the one or more memory banks corresponding to a specific logic device cluster is disposed in a center region of the one or more memory banks corresponding to the specific logic device cluster.

19. The computing device of clause 1, wherein the stacked memory and the plurality of logic device clusters are connected to establish memory accessing channels by a plurality of arrays of I/O pads associated with each of the plurality of logic device clusters, wherein each array of the I/O pads is disposed in proximity to the master devices of the coupled logic device cluster.

20. The computing device of clause 19, wherein the stacked memory is disposed on a second die that is bonded to the first die, and the computing device further comprises a plurality of first arrays of hybrid bonding pads disposed on the second die, and a plurality of second arrays of hybrid bonding pads disposed on the first die, wherein the plurality of first arrays of hybrid bonding pads and the plurality of second arrays of hybrid bonding pads are of one-to-one correspondence to the plurality of arrays of I/O pads such that memory accessing channels is formed by electrically connecting the plurality of second arrays of hybrid bonding pads to the plurality of first arrays of hybrid bonding pads.

21. The computing device of clause 20, wherein each of the plurality of second arrays of hybrid bonding pads is disposed in a region on the first die between adjacent logic device cluster.

22. A method for facilitating data access and data transfer operation in a computing device comprising in a system-on-chip, wherein the system-on-chip comprises a plurality of master devices and a stacked memory disposed above the master devices, the method comprising:

grouping the master devices into a plurality of logic device clusters based on operating requirements of the master devices;

assigning one or more memory banks of the stacked memory to each logic device cluster based on the operating requirements of each master device;

formulating a network-on-chip (NoC) topology based on a data transfer traffic between the at least one master device of the plurality of logic device clusters and the assigned one or more memory banks; and formulating an arrangement of the master devices based on the plurality of logic device clusters grouped and corresponding connections between the master devices and the memory banks of the stacked memory.

23. The method of clause 22, wherein the NoC topology which comprises a plurality of NoC nodes, and the one or more memory banks in the stacked memory are grouped into a plurality of memory clusters, wherein each memory cluster is coupled to each respective logic device cluster through an input/output (I/O) pad, and the plurality of memory clusters are coupled through the plurality of NoC nodes.

24. The method of clause 23, wherein the plurality of logic device clusters are linked to the plurality of NoC nodes of the NoC topology, and the method further comprises: configuring, via each NoC node, memory accesses between a corresponding logic device cluster of the plurality of logic device clusters and the memory clusters associated with one or more logic device clusters of the plurality of logic device clusters neighboring to the corresponding logic device cluster.

25. The method of clause 24, wherein each memory cluster comprises a memory cluster controller, and each NoC node includes an NoC node controller coupled to the memory cluster controller of corresponding memory clusters, wherein the memory cluster controller of a first memory cluster of the plurality of memory clusters is assigned to a first master device of a first logic device cluster, and the method further comprises:

in response to the memory cluster controller of a first memory cluster of the plurality of memory clusters assigned to a first master device of a first logic device cluster determining that a first memory address included in a memory access command being issued from the first master device of the first logic device cluster is located within a first address range of the first memory cluster, causing the memory cluster controller of the first memory cluster to operatively establish a first data access connection between the first master device of the first logic device cluster and the first memory cluster, the first memory cluster comprising at least one memory bank of the stacked memory.

26. The method of clause 25, further comprising,
    in response to the memory cluster controller of the first memory cluster determining that a second memory address included in a memory access command exceeds the first address range of the first memory cluster, causing the memory cluster controller of the first memory cluster to operatively forward the memory access command containing the second memory address to the NoC node controller of a first NoC node included in the plurality of NoC nodes coupled to the memory cluster controller of the first memory cluster.

27. The method of clause 26, further comprising:
    in response to the NoC node controller of the first NoC node determining that the a second memory address indicated by the memory access command is located within a second memory address range of a second memory cluster of the plurality of memory clusters assigned to a second logic device cluster of the plurality of logic device clusters, causing the NoC node controller of the first NoC node to operatively send a message containing first cluster network access request to a second NoC node of the plurality of NoC nodes corresponding to the second memory cluster corresponding to the second memory address through the first NoC node to perform the second tier operation.

28. The method of clause 27, further comprising:
    in response to receiving the message containing the first cluster network access request, causing the NoC node controller of the second NoC node to determine whether the second memory address indicated by the first cluster network access request is located within the second memory address range of the second memory cluster; and
    in response to the NoC node controller of the second NoC node determining that the second memory address indicated by the first cluster network access request is located within the second memory address range of the second memory cluster, causing the NoC node controller of the second NoC node to operatively establish a second data access connection between the first logic device cluster and the second memory cluster of the plurality of memory clusters assigned to the second logic device cluster through the first NoC node, the second memory cluster comprising at least one memory banks of the stacked memory that is different from the at least one memory bank of the first memory cluster.

29. The method of clause 27, wherein the system-on-chip further comprises an external memory controller for controlling access of an external memory coupled to the system-on-chip, and the method further comprises:

in response to the NoC node controller of the first NoC node coupled to the memory cluster controller of the first memory address determining that a third memory address indicated by the memory access command exceeds the first memory address range of the first memory cluster, causing the memory controller to operatively forward the memory access command to the NoC node controller of the first NoC node;
    in response to the NoC node controller of the first NoC node determining that the third memory address is exceeds a memory address range of the stacked memory, causing the NoC node controller of the first NoC node to operatively send a message containing a second cluster network access request to the external memory controller of the system-on-chip through at least one of the second NoC node and a third NoC node to perform a third tier operation; and
    in response to the external memory controller receiving the message containing the second cluster network access request, causing the external memory controller to operatively establish a third data access connection between the first logic device cluster and the external memory through at least one of the first NoC node, the second NoC node, and the third NoC node.

30. The method of clause 29, further comprising: the memory cluster controller of the first memory cluster is operate to determine whether a memory access operation of the memory access command corresponds to the first tier operation, the second tier operation, or the third tier operation based on a programmed memory address included in the memory access command.

31. The method of clause 22, wherein the operating requirements of the master devices comprises requirements for bandwidth and memory capacity of the master devices.

32. The method of clause 31, wherein the operating requirements of the master devices further comprises latency requirements of the master devices.

33. The method of clause 22, wherein the master devices are processing cores with different functions.

34. The method of clause 33, wherein the master devices comprises a CPU (central processing unit) core, an NPU (neural processing unit) core, an IPU (intelligence processing core) core, a VE (video encoder) core, a DP (digital processing) core, and an ISP (image signal processing) core.

35. The method of clause 34, wherein the NPU core and IPU core are disposed in adjacent to each other in a physical layout of the first die, and the DP core and the ISP core are disposed next to each other in the physical layout of the first die.

36. The method of clause 23, further comprising: connecting the stacked memory and the plurality of logic device clusters to establish memory accessing channels by an array of through silicon vias connected between each respective I/O pad corresponding to each memory cluster and each NoC node corresponding to each logic device cluster, wherein each of the I/O pads is disposed in proximity to the master device of the coupled logic device cluster.

37. The method of clause 36, wherein each of the I/O pads is disposed at a first edge of the corresponding memory cluster or first boundary between adjacent memory clusters, and each of the NoC nodes is disposed on a second edge or a second boundary between adjacent master devices.

38. The method of clause 37, further comprising: disposing the transmission interface of the one or more memory banks corresponding to a specific logic device cluster in a center region of the one or more memory banks assigned to the specific logic device cluster.

Relative dimensions of components in drawings may be exaggerated for clarity. Within the description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A computing device comprising a system-on-chip (SoC) device, the SoC device comprising:
   a plurality of master devices, arranged on a first die of the SoC device, wherein the master devices are grouped in space into a plurality of logic device clusters based on a clustering scheme defined according to operating requirements of the master devices; and
   a stacked memory, disposed above the first die,
   wherein connections between the stacked memory and the plurality of logic device clusters are established according to the clustering scheme defined,
   wherein the connections establish a network-on-chip (NoC) topology that comprises a plurality of NoC nodes, and one or more memory banks in the stacked memory are grouped into a plurality of memory clusters, wherein the plurality of memory clusters are connected through the plurality of NoC nodes, and
   wherein each memory cluster includes a memory cluster controller, and each NoC node includes an NoC node controller coupled to the corresponding memory cluster controller of the coupled memory cluster, wherein in response to the memory cluster controller of a first memory cluster of the plurality of memory clusters assigned to a first logic device cluster determining that a memory access command being issued from a first master device of a first logic device cluster contains a first memory address that is within a first memory address range of the first memory cluster, the memory cluster controller of the first memory cluster operatively establishes a first data access connection between the first master device of the first logic device cluster and the first memory cluster of the plurality of memory clusters to initiate a first tier operation, the first memory cluster comprising at least one memory bank of the stacked memory.

2. The computing device of claim 1, wherein in response to the memory cluster controller of the first memory cluster determining that a second memory address indicated by the memory access command issued from the first master device of the first logic device cluster exceeds the first memory address range of the first memory cluster, the memory cluster controller operatively forwards the memory access command to the NoC node controller of a first NoC node included in the plurality of NoC nodes being coupled to the memory cluster controller of the first memory cluster, and
   wherein in response to the memory cluster controller determining that the second memory address exceeds the first memory address range of the first memory cluster, the memory cluster controller of the first memory cluster operatively communicates with the NoC node controller of the coupled first NoC node, and causes the NoC node controller of the coupled first NoC node to send a message containing a first cluster network access request to a second NoC node of the plurality of NoC nodes corresponding to a second memory cluster through the first NoC node when determines that the second memory address is located within a second memory address range of the second memory cluster assigned to a second logic device cluster of the plurality of logic device clusters so as to perform a second tier operation.

3. The computing device of claim 2, wherein in response to receiving a message including a first cluster network access request containing a second memory address, the NoC node controller of the second NoC node determines whether the second memory address indicated by the first cluster network access request is located within the second memory address range of the second memory cluster, wherein in response to the NoC node controller of the second NoC node determining the second memory address indicated by the first cluster network access request is within the second memory address range of the second memory cluster, the NoC node controller of the second NoC node operatively establishes a second data access connection between the first logic device cluster and the second memory cluster of the plurality of memory clusters assigned to the second logic device cluster through the first NoC node, the second memory cluster comprising at least one memory bank of the stacked memory that is different from the at least one memory bank of the first memory cluster.

4. The computing device of claim 3, further comprising an external memory controller for controlling access of an external memory coupled to the SoC device,
   wherein in response to the memory cluster controller of the first memory cluster coupled to the NoC node controller of the first NoC node determining that a third memory address indicated by the memory command exceeds the first memory address range of the first memory cluster, and the memory cluster controller forwards the memory access command to the NoC node controller of the first NoC node,
   wherein in response to the NoC node controller of the first NoC node determining that the third memory address indicated by the first cluster network access request of the message is outside of a memory address range of the stacked memory, the NoC node controller of the first NoC node operatively sends a second cluster network access request containing the third memory address to the external memory controller through at least one of the second NoC node and a third NoC node to perform a third tier operation, and wherein in response to the external memory controller receiving the second cluster network access request containing the third memory address, the external memory controller operatively establishes a third data access connection between the first logic device cluster and the external memory through at least one of the first NoC node, the second NoC node, and the third NoC node.

5. The computing device of claim 4, wherein the memory cluster controller of the first memory cluster operatively determines whether a memory access operation of the memory access command corresponds to the first tier operation, the second tier operation, or the third tier operation based on a programmed memory address included in the memory access command.

6. A computing device comprising a system-on-chip (SoC) device, the SoC device comprising:

a plurality of master devices, arranged on a first die of the SoC device, wherein the master devices are grouped in space into a plurality of logic device clusters based on a clustering scheme defined according to operating requirements of the master devices; and a stacked memory, disposed above the first die, wherein connections between the stacked memory and the plurality of logic device clusters are established according to the clustering scheme defined, wherein the connections establish a network-on-chip (NoC) topology that comprises a plurality of NoC nodes, and one or more memory banks in the stacked memory are grouped into a plurality of memory clusters, wherein the plurality of memory clusters are connected through the plurality of NoC nodes, wherein the stacked memory and the plurality of logic device clusters are connected to establish memory accessing channels by a plurality of arrays of I/O pads associated with each of the plurality of logic device clusters, wherein each array of the I/O pads is disposed in proximity to the master devices of the coupled logic device cluster, and wherein the stacked memory is disposed on a second die that is bonded to the first die, and the computing device further comprises a plurality of first arrays of hybrid bonding pads disposed on the second die, and a plurality of second arrays of hybrid bonding pads disposed on the first die, wherein the plurality of first arrays of hybrid bonding pads and the plurality of second arrays of hybrid bonding pads are of one-to-one correspondence to the plurality of arrays of I/O pads such that memory accessing channels is formed by electrically connecting the plurality of second arrays of hybrid bonding pads to the plurality of first arrays of hybrid bonding pads.

7. The computing device of claim 6, wherein each of the plurality of second arrays of hybrid bonding pads is disposed in a region on the first die between adjacent logic device clusters.

*    *    *    *    *